P. F. SPERY.
RADIATOR FOR MOTOR DRIVEN VEHICLES.
APPLICATION FILED DEC. 28, 1918.
1,316,858.
Patented Sept. 23, 1919.
2 SHEETS—SHEET 1.
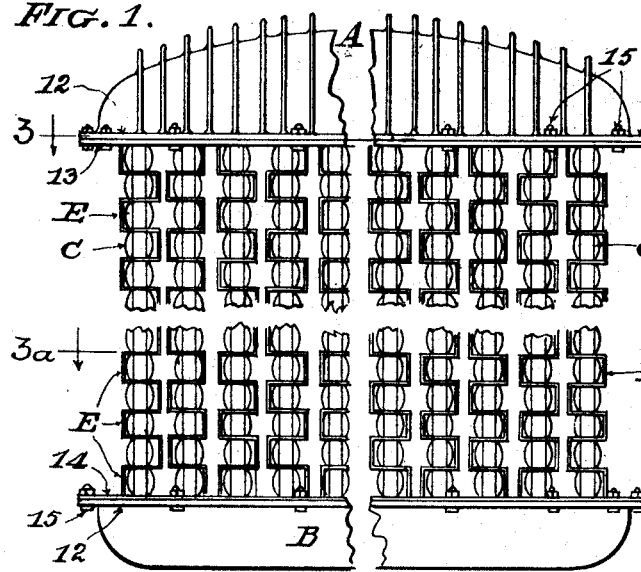
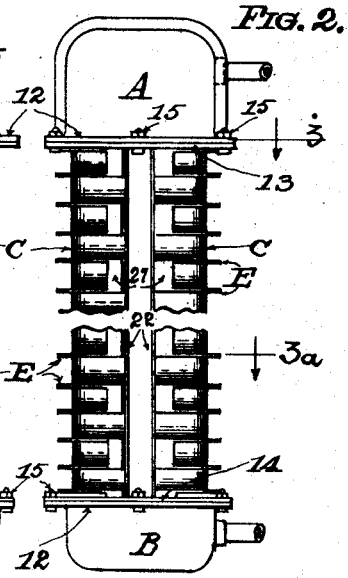
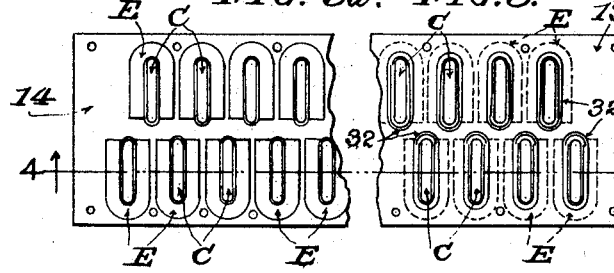
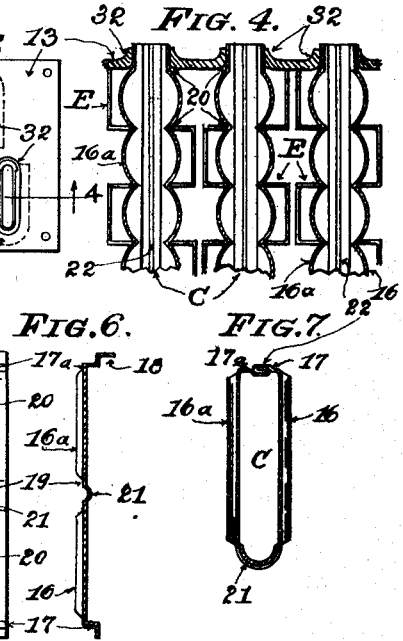
WITNESS:
INVENTOR:
PHILMORE F. SPERY,
BY
ATTORNEYS.

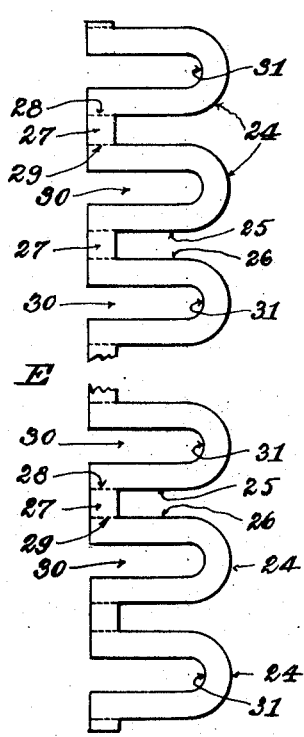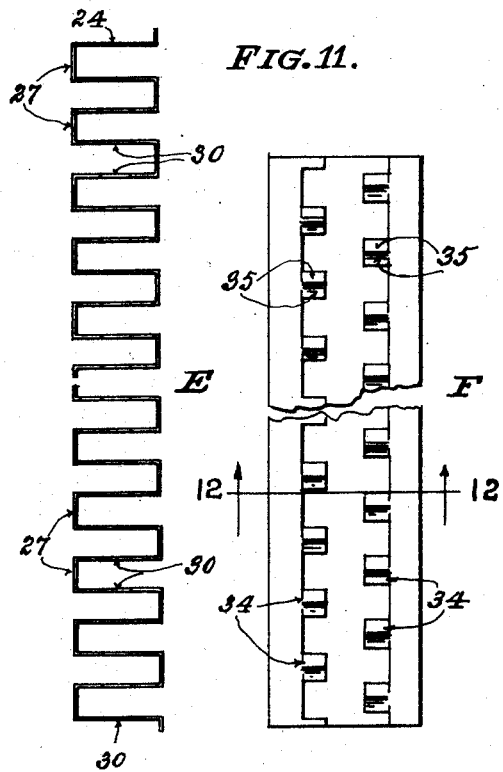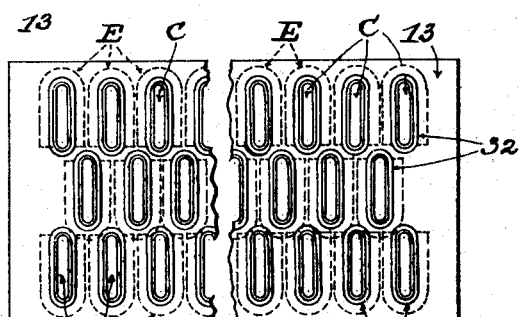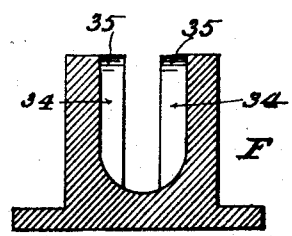

UNITED STATES PATENT OFFICE.

PHILMORE F. SPERY, OF CHICAGO, ILLINOIS.

RADIATOR FOR MOTOR-DRIVEN VEHICLES.

1,316,858.   Specification of Letters Patent.   Patented Sept. 23, 1919.

Application filed December 28, 1918. Serial No. 268,680.

*To all whom it may concern:*

Be it known that I, PHILMORE F. SPERY, a citizen of the United States, and a resident of the city of Chicago, in the county of Cook and State of Illinois, have invented a certain new and useful Improvement in Radiators for Motor-Driven Vehicles; and I do hereby declare that the following description of my said invention, taken in connection with the accompanying sheets of drawing, forms a full, clear, and exact specification, which will enable others skilled in the art to which it appertains to make and use the same.

My invention relates generally to improvements in radiators for motor driven vehicles; and it consists, essentially, in the novel and peculiar combination of parts and details of construction, as hereinafter first fully set forth and described and then pointed out in the claims.

The object of my present invention is the production of an efficient and serviceable radiator for motor driven vehicles which, while adapted for general use in this class of vehicles, is especially well adapted for employment in motor trucks, tractors, aeroplanes, etc., in which the more powerful internal combustion motors are installed for heavy duty. This radiator is of the tubular type of construction, the tubes being provided with laterally extending fins or flanges which serve as heat conductors to abstract heat from the water passing through the tubes, by coming in contact with the air surrounding the water tubes and the fins.

In the preferred embodiment of this invention, the water tubes are oblong in transverse section, and rather narrow, to reduce the bulk of the water therein as much as practicable to attain the best results in the cooling effect, but of sufficient width to prevent clogging by sediments and other impurities carried by the water passing through the tubes.

In the drawings forming a part of this specification—Figure 1 is a front elevation of the radiator. Fig. 2 is an end elevation of the same. Fig. 3 is a plan of a portion of the radiator below the line 3—3 of Fig. 1. Fig. 3$^a$ is a sectional plan on line 3$^a$—3$^a$ of Fig. 1. Fig. 4 is a sectional elevation on an increased scale of a portion of the water tubes and showing the method of securing these tubes to plates. Fig. 5 is a plan of a strip of metal of which the water tubes are formed. Fig. 6 is a sectional view of the same on line 6—6 of Fig. 5. Fig. 7 is a similar view on an increased scale of one of the water tubes detached. Fig. 8 is a plan of a strip of metal forming the fins for the water tubes; and Fig. 9 is an edge view of the same. Fig. 10 is a plan similar to Fig. 3, showing a modification of the radiator. Figs. 11 and 12 are detail views of a jig for assembling the tubes and the fins thereon.

Like parts are designated by the same characters and symbols of reference in all the various figures.

This radiator comprises an upper header or water reservoir A, and a lower tank B, between which there are a multiplicity of water tubes connecting these two containers. These two receptacles have each a laterally extending flange 12, and the water tubes C, are fixedly connected to plates 13, 14, at their upper and lower ends, which plates are bolted to the flanges 12 by bolts 15, as illustrated in Figs. 1 and 2. As shown in Figs. 2, 3, and 3$^a$, there are two rows of these water tubes, the rows being staggered, the object of which will farther on appear; and where a radiator of maximum capacity is required these rows of water tubes may be increased to three, as indicated in Fig. 10, and more, if desired or found necessary; the rows of tubes being in all cases staggeringly arranged.

A water tube C is formed of a strip or ribbon of thin sheet metal, such as brass or copper, owing to the high heat conducting efficiency of these metals, and their being practically non-corrosive under the action of moisture. This strip or ribbon is, preferably of a length somewhat in excess of the distance between the upper and lower reservoirs A, B, and it is transversely undulated at both sides of the longitudinal center line of the ribbon by a series of corrugations 16, 16$^a$, the outer terminals of which stop short of the longitudinal margins of the ribbon to afford at these margins blank spaces or portions 17, 17$^a$, which are hook-shaped, as shown in Fig. 6, to afford the male and female parts of a lock-seam of well-known construction. These corrugations also stop short of the longitudinal center of the ribbon, to afford a flat land 19; and in this land there are formed shallow depressions, 21, alined with the crotches 20, formed by the corrugations at the lines where they merge into one another. This ribbon is bent longitudinally through the center land 19, to U-shaped formation transversely, as illustrated best in Fig. 7, and then the adjacent margins 17, 17ª, interlocked to afford a lock-seam 22, for the tube.

The object of corrugating the two tube walls, preferably with arcuate corrugations, is primarily to increase the cooling area or surfaces of the tube, and then to afford at the meeting joints of the corrugations crotches 20, wherein to seat radiating fins E, shown detached in Figs. 8 and 9. These fins are integrally formed from a strip of sheet metal of proper width, by being punched to form a multiplicity of U-shaped blades 24, in equally spaced relationship, adjacent, parallel, limbs 25, 26, of the blades being connected by a strip 27. This strip is then folded or bent back and forth along the margins of the blades, as indicated by dotted lines 28, 29, so as to afford the right-angular zig-zag formation shown in Fig. 9. This strip is placed upon a water tube in such manner that the slots 30, therein embrace two sides and one end of said tube and seat in the crotches 20, while the substantially semicircular parts 31 of the slots 30 seat in the slight depressions 21 at the curved edge of the tube. The tube with the fins E properly placed is then dipped into a bath of molten solder which coats the entire tube and the fins with a coat of solder and thereby homogeneously unites the fins to the tube and at the same time hermetically seals the locked seam 22.

The top and bottom plates 13, 14, are alike in construction. They are made, preferably, of sheet steel of ample thickness, in which there are punched in properly spaced apart relationship, a series of narrow, oblong, holes, less in length and width than the external transverse dimensions of the tubes C. A punch is then applied to the plate, having a transverse shape corresponding to that of the water tube, and this punch will then force the metal of the plate surrounding said oblong hole outwardly to form outwardly extending lips or flanges 32, through which the ends of the tubes C are passed and from which, preferably, they slightly project. After the tubes have all been assembled in the plates they are homogeneously connected thereto by first dipping one, and then the other plate into molten solder.

Attention is now directed to the fact that the formed strip of fins is readily handled, and that its application to a tube presents no material difficulty, notwithstanding the fact that in a radiator in which there are tubes of say 20 inches in length, there are approximately 80 of these fins. This assembling I accomplish by dropping the fin-strip into a trough F, Figs. 11, 12, in which there are projections 34, extending alternately from one, and then from the other side of said trough. These projections 34 are accurately spaced apart to coincide with the proper spacing of the fins, and their sides are beveled at their upper ends, as at 35, to facilitate the placing of the fin-strip into the trough. In this condition the tube is pushed—curved edge downwardly—into the trough which properly locates the fins and causes them to adhere to the tube with sufficient force to permit the tube being easily handled without danger of displacement of the fins, and it is subsequently immersed into the soldering bath. This method of assembling the tubes and fins is positively certain and effective and probably as efficient, if not more so, than any other mechanical means for applying the fin-strips to the water tubes.

I have hereinbefore stated that the water tubes are staggeringly arranged in the top and bottom plates. The object of thus placing these rows of tubes is to cause the air passing horizontally between the tubes to take a circuitous course and thereby to impinge upon the external surfaces of the tubes with greater force and thus secure the best obtainable effect of reducing the temperature of the downwardly moving current of water in these tubes.

While I have hereinbefore described the preferred embodiment of my invention, I desire it to be understood that I am aware that changes in the details thereof may be made, and parts omitted without departing from the scope of my invention as defined in the appended claims.

Having thus fully described this invention, I claim as new, and desire to secure to myself by Letters Patent of the United States—

1. A radiator for reducing the temperature of the water employed in internal combustion engines, comprising an upper reservoir, a lower reservoir, and a multiplicity of rows of vertically disposed tubes connecting said reservoirs, said tubes being staggeringly disposed, said water tubes being transversely corrugated, said tubes having laterally extending fins, said fins being of substantially U-shape and embracing three sides of said tubes, said fins occupying the crotches formed by said corrugations.

2. A radiator of the nature described, comprising an upper and a lower reservoir, and a multiplicity of rows of vertically disposed tubes connecting said reservoirs, said tubes being staggeringly disposed, said tubes having laterally extending fins, said fins being of substantially U-shape and embracing three sides of said tubes, said fins being interconnected at one of their terminals, said tubes being provided with integrally formed means for locating the fins in spaced apart positions.

3. In a radiator of the nature described, a series of water tubes, said water tubes being of oblong shape transversely, opposing walls of the tube being transversely corrugated to afford crotches between the corrugations, there being extending from said tube a multiplicity of closely-spaced, U-shaped fins, said fins embracing two sides and one marginal edge of said tube, said fins being located in said crotches and integrally connected thereto by soldering.

4. In a radiator of the nature described, a water tube, said tube being formed of a metallic ribbon, said ribbon having its longitudinal margins edged to form male and female members of a lock-seam, said ribbon having in its longitudinal center a flat land, said ribbon being transversely corrugated between its longitudinal margins and said land, said land having transversely disposed, shallow depressions in alinement with the crotches formed at the junctions of said corrugations, said ribbon being formed into an oblong tube, one edge of said tube being curved, the other edge of said tube being formed by interlocking the male and female members of said ribbon.

5. In a radiator of the nature described, an upper and a lower reservoir, and a series of rows of tubes connecting said reservoirs, said tubes having an oblong transverse sectional contour, each of said tubes having a multiplicity of laterally extending fins, said fins embracing two sides and one longitudinal edge of said tubes, said fins being formed from a single strip of metal, adjacent ends of said fins being integrally connected, said connections being bent and rebent so that all the fins are in horizontal parallel spaced relationship, the connections being alternately at one, and then at the other side of said tube.

In testimony that I claim the foregoing as my invention, I have hereunto set my hand.

PHILMORE F. SPERY.

Copies of this patent may be obtained for five cents each, by addressing the "Commissioner of Patents, Washington, D. C."